(12) United States Patent
Bialkowski et al.

(10) Patent No.: US 8,486,361 B2
(45) Date of Patent: Jul. 16, 2013

(54) SYSTEM AND METHOD FOR GENERATING A CARBON DIOXIDE STREAM

(75) Inventors: Michal T. Bialkowski, Untersiggenthal (CH); Gisbert Wolfgang Kaefer, Birmenstorf (CH)

(73) Assignee: ALSTOM Technology Ltd, Baden (CH)

( * ) Notice: Subject to any disclaimer, the term of this patent is extended or adjusted under 35 U.S.C. 154(b) by 372 days.

(21) Appl. No.: 12/721,638

(22) Filed: Mar. 11, 2010

(65) Prior Publication Data

US 2011/0223083 A1    Sep. 15, 2011

(51) Int. Cl.
*C01B 31/20*    (2006.01)
(52) U.S. Cl.
USPC ..................... 423/437.1; 423/437.2
(58) Field of Classification Search
USPC .............. 62/617; 95/116, 129, 134, 135, 139, 95/140; 423/99, 110, 212, 213.2, 213.7, 220, 423/224, 230, 235, 242.1, 246, 437.2
See application file for complete search history.

(56) References Cited

U.S. PATENT DOCUMENTS 4,364,915 A     12/1982 Proctor
2011/0011128 A1*  1/2011 Grover ............................ 62/617

FOREIGN PATENT DOCUMENTS

| EP | 0469781 | 2/1992 |
| WO | WO 03/070635 | 8/2003 |

OTHER PUBLICATIONS

Cao Y., Pan W., "Investigation of Chemical Looping Combustion by Solid Fuels. 1.Process Analysis", Energy&Fuels, 2006, vol. 20, pp. 1836-1844.
Lygnfelt A., Lecker B., Mattisson T., "A fluidized-bed combustion process with inherent CO2 separation; application of chemical-looping combustion". Chem. Eng. Science, vol. 56, 2001, pp. 3101-3113.
Consonni S., Lozza G., Pelliccia G., Rossini S., Saviano R., "Chemical-Looping Combustion for Combined Cycles With CO2 Capture". Journal of Engineering. For Gas Turbines and Power, Jul. 2006, vol. 128, pp. 525-534.
Johansson E., Lyngfelt A., Mattisson T., Johnsson F., "Gas leakage measurements in a cold model of interconnected fluidized bed for chemical-looping combustion". Powder Technology, vol. 134, 2003, pp. 210-217.
PCT International Search Report and the Written Opinion of the International Searching Authority dated Jun. 7, 2011—(PCT/IB2011/000423).

* cited by examiner

*Primary Examiner* — Melvin C Mayes
*Assistant Examiner* — Sheng H Davis
(74) *Attorney, Agent, or Firm* — James J. Cummings

(57) ABSTRACT

A flue gas stream processing system includes a fuel reactor for combusting a fuel to generate a flue gas stream including water vapor, carbon monoxide and carbon dioxide. The system includes an oxidation catalyst downstream of the fuel reactor, the oxidation catalyst configured to receive the flue gas stream and oxidize the carbon monoxide to form a carbon dioxide rich flue gas stream, and a processing unit to liquefy carbon dioxide in the carbon dioxide rich flue gas stream and generate an exhaust gas.

17 Claims, 2 Drawing Sheets

US 8,486,361 B2

SYSTEM AND METHOD FOR GENERATING A CARBON DIOXIDE STREAM

BACKGROUND

1. Field

The present disclosure generally relates to a system and method for generating a carbon dioxide stream. More particularly, the present disclosure relates to generating a carbon dioxide stream in a flue gas stream processing system employing a chemical looping combustion system.

2. Related Art

Chemical looping combustion (CLC) is a combustion technology that affords inherent separation of carbon dioxide ($CO_2$). Typically, CLC employs two reactors: an air reactor and a fuel reactor. A solid oxygen carrier, which may be a metal, transfers the oxygen from the air to the fuel. The fuel is fed to the fuel reactor where it is oxidized by the oxygen carrier and the oxygen is carrier is reduced and retuned to the air reactor, where it is oxidized and the loop of oxidizing the fuel and reducing the carrier continues. The exit stream from the fuel reactor, commonly referred to as the flue gas, typically contains $CO_2$ and water vapor. However, depending on the fuel, the flue gas may also contain trace contaminants. The water vapor in the flue gas is separated from the $CO_2$ by cooling and condensation, while the $CO_2$ is liquefied or compressed for further transport.

Due to its limited residence time in the fuel reactor and the lack of free oxygen, the $CO_2$ stream may be contaminated with products of incomplete combustion, such as carbon monoxide (CO), hydrogen ($H_2$), and methane ($CH_4$). Additionally, the flue gas stream may be diluted with air, which may in-leak to the boiler.

Contaminants such as CO, $H_2$, and $CH_4$ are more difficult to liquefy than $CO_2$ during liquification of the $CO_2$. The contaminants take the form of a non-condensable phase commonly referred to as a exhaust gas. The level of contaminates within the exhaust gas as is often too high to be released to the atmosphere without further treatment. Recycling of the exhaust gas to the fuel reactor would result in gradual accumulation of $N_2$ and other inert gases in the flue gas and may also dilute the $CO_2$ stream, thereby reducing the efficiency of the CLC system.

Accordingly, a method or system for processing the exhaust gas in an efficient way without impacting the CLC system is desired.

SUMMARY

According to aspects illustrated herein, there is provided a method of generating a liquefied carbon dioxide stream, the method comprising: generating a flue gas stream including carbon monoxide and water vapor; subjecting the flue gas stream to an oxidation catalyst for oxidizing the carbon monoxide, thereby generating a carbon dioxide rich flue gas stream; and processing the carbon dioxide rich flue gas stream to form a liquefied carbon dioxide stream.

According to other aspects illustrated herein, there is provided a flue gas stream processing system comprising: a fuel reactor for combusting a fuel to generate a flue gas stream including water vapor, carbon monoxide and carbon dioxide; an oxidation catalyst downstream of the fuel reactor, the oxidation catalyst configured to receive the flue gas stream and oxidize the carbon monoxide to form a carbon dioxide rich flue gas stream; and a processing unit to liquefy carbon dioxide in the carbon dioxide rich flue gas stream and generate an exhaust gas.

According to other aspects illustrated herein, there is provided a method for reducing an amount of contaminants released by a flue gas stream processing system, the method comprising: generating a flue gas stream by combustion of a fuel in a fuel reactor of a chemical looping combustion system, the flue gas stream includes water vapor and carbon monoxide; forming a liquefied carbon dioxide stream by removing water vapor and carbon monoxide from the flue gas stream; generating an exhaust gas during formation of the liquefied carbon dioxide stream; and providing at least a portion of the exhaust gas to an air reactor in the chemical looping combustion system, thereby reducing an amount of contaminants released by a flue gas stream processing system.

The above described and other features are exemplified by the following figures and detailed description.

BRIEF DESCRIPTION OF THE DRAWINGS

Referring now to the figures, which are exemplary embodiments, and wherein the like elements are number alike.

DETAILED DESCRIPTION

Figure 1:
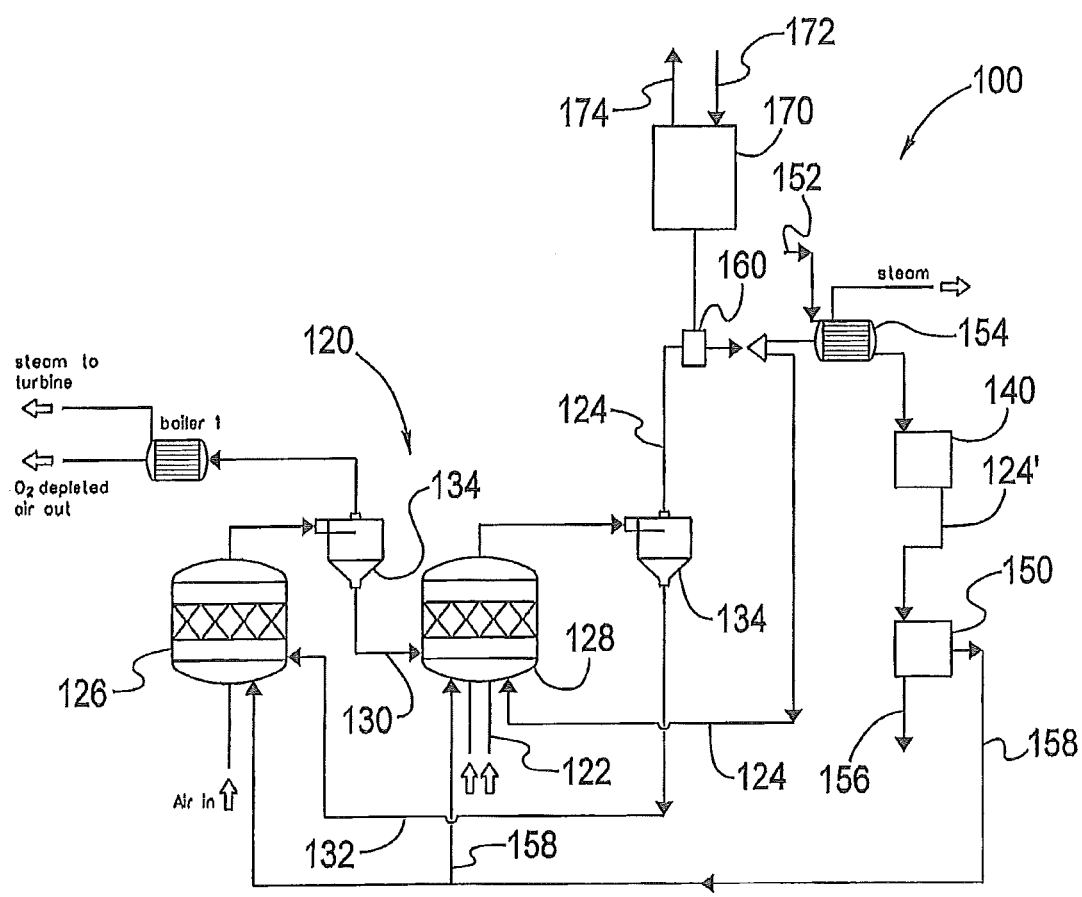
FIG. 1 is a schematic block diagram of one embodiment of the system disclosed herein.

FIG. 1 illustrates a flue gas stream processing system 100 having a combustion system 120. The combustion system 120 may be any system capable of combusting a fuel 122 to form a flue gas 124. The combustion system 120 illustrated in FIG. 1 is a chemical looping combustion system that includes an air reactor 126 and a fuel reactor 128. The flue gas stream processing system 100 is not limited in this regard since the combustion system 120 may be other combustion systems, including, but not limited to boilers, furnaces, and the like.

In operation, the chemical looping combustion system 120 includes an oxygen carrier 130, which transfers oxygen from the air present in the air reactor 126 to the fuel 122 provided to the fuel reactor 128. The fuel 122 is oxidized by the oxygen carrier 130 in the fuel reactor 128 and the oxygen carrier is reduced and returned to the air reactor 126 as a reduced oxygen carrier 132. The reduced oxygen carrier 132 is oxidized in the air reactor 126 and the loop of oxidizing the fuel 122 and reducing the oxygen carrier 130 continues. The oxygen carrier 130 may be a metal, such as, but not limited to nickel, copper, iron, manganese, cadmium, and cobalt.

As shown in FIG. 1, the chemical loop combustion system 120 may include one or more cyclones 134, which facilitate the separation of the oxygen carrier 130 from depleted air and separation of the flue gas stream 124 from the reduced oxygen carrier 132.

Oxidation of the fuel 122 in the fuel reactor 128 produces the flue gas stream 124, a portion of which may be recycled to the fuel reactor 128. The flue gas stream 124 typically contains carbon monoxide (CO) carbon dioxide ($CO_2$) and water vapor. However, depending on the fuel, the flue gas stream 124 may also contain varying concentrations of trace contaminants, such as, but not limited to sulfur oxides (SOx), nitrogen oxides (NOx), mercury, hydrogen ($H_2$), and methane ($CH_4$). The flue gas stream 124 may also include contaminants such as fly ash as well as unburnt fuel (referred to as "unburnts").

The oxygen required for the oxidation of the carbon monoxide can be introduced by an air stream 152 that leaks into a boiler 154, through which the flue gas stream 124 passes.

Oxidation of carbon monoxide forms carbon dioxide, which can be condensed and liquefied in the processing unit 150. The leakage of air stream 152 into the boiler 154 is typically about 2% of the volume flue of the flue gas stream 124.

Removal of the contaminants present in the flue gas stream 124 may be conducted by providing the flue gas stream to a contaminant removal system 140 prior to introduction to a processing unit 150. Examples of contaminant removal systems 140 include, but are not limited to, particle removable devices, desulfurization systems such as wet flue gas desulfurization (WFGD) or dry flue gas desulfurization (DFGD), nitrogen oxide (NOx) removal systems, mercury removal systems (e.g., activated carbon), and the like, and combinations thereof. Removal of at least a portion of the contaminants from the flue gas stream 124 produces a carbon dioxide rich flue gas stream 124', which is introduced to the processing unit 150.

The processing unit 150 condenses and liquefies the carbon dioxide present in the carbon dioxide rich flue gas stream 124', while removing any remaining contaminants to produce a carbon dioxide stream 156 and an exhaust gas 158. The carbon dioxide stream 156 is transported in liquefied form to another location for compression, use and/or storage.

The exhaust gas 158 typically contains material that was not removed from the flue gas stream 124, such as nitrogen, hydrogen, oxygen and carbon monoxide.

In one embodiment, as shown in FIG. 1, if the carbon monoxide present in the flue gas stream 124 is less than about one percent by volume (1% by vol.) of the carbon dioxide concentration in the flue gas stream, at least a portion of the exhaust gas 158 may be returned to the air reactor 126.

Measurement of the carbon monoxide concentration in the flue gas stream 124 may be obtained by a measuring device 160. The measuring device 160 may be any device capable of obtaining measurements of a carbon monoxide concentration. Examples of the measuring device 160 include, but are not limited to a sensor or a combustion gas analyzer, e.g., a Fyrite® analyzer. The measuring device 160 may be coupled to a controller 170, e.g., a data processor, capable of accepting operating instructions 172 from a user and provide the user with data 174 concerning the measured concentration.

Figure 2:
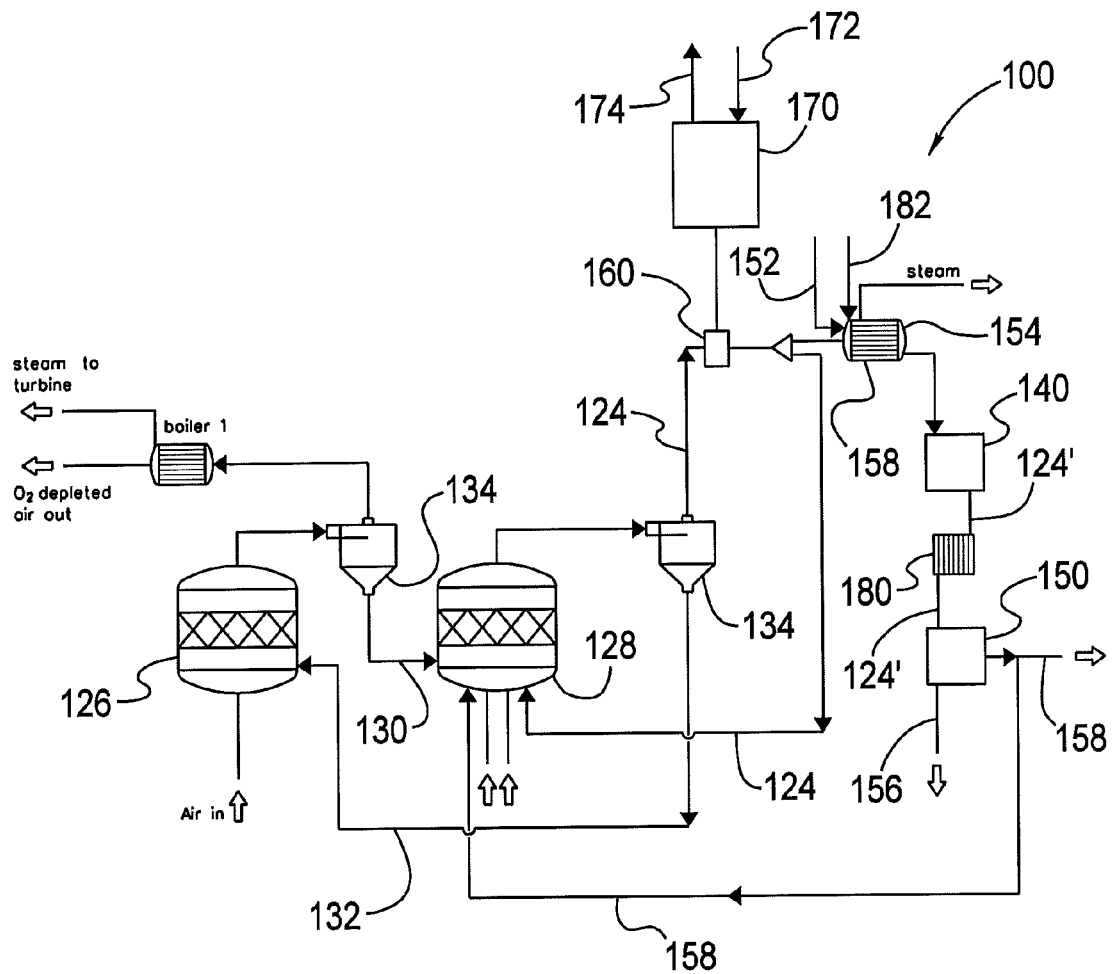
FIG. 2 is a schematic block diagram of one embodiment of the system disclosed herein.

In another embodiment, as illustrated in FIG. 2, if the concentration of the carbon monoxide present in the flue gas stream 124 is about one percent by volume (1% by vol.) or greater than the carbon dioxide concentration in the flue gas stream 124, the exhaust gas 158 is not returned to the air reactor 126 and is instead provided to the atmosphere. Additionally, the carbon dioxide rich flue gas stream 124' is subjected to further processing prior to introduction to the processing unit 150. Specifically, an oxidation catalyst 180 is placed downstream from the fuel reactor 128 at a location between the contaminant removal system 140 and the processing unit 150. The oxidation catalyst 180 facilitates the oxidation of carbon monoxide present in the carbon dioxide rich flue gas stream 124' to form carbon dioxide.

The oxidation catalyst 180 works in conjunction with the air stream 152 to oxidize the carbon monoxide present in the flue gas stream. If the carbon monoxide concentration in the flue gas stream 124 is less than about 3% by volume of the carbon dioxide concentration in the flue gas stream, the air stream 152 that is 2% of the volume of the flue gas stream should be sufficient for oxidation. However, if the volume of air stream 152 is less than 2% of the flue gas stream 124, or the carbon monoxide concentration is 3% by volume or greater, additional oxygen maybe added for oxidation purposes. To increase efficiency of oxidation of the carbon monoxide, or to ensure the volume of air stream 152 is at the desired level, the amount of air stream that leaks through the boiler 154 can be increased. Alternatively, an oxygen producing unit, such as an air separator, may provide an oxygen stream 182 to increase the oxidation of the carbon monoxide.

Oxidation of carbon monoxide present in the flue gas stream 124 allows the exhaust gas 158 to either be reused within the flue gas processing system 100 or contain concentrations of contaminants that are acceptable in release to the atmosphere.

While the invention has been described with reference to various exemplary embodiments, it will be understood by those skilled in the art that various changes may be made and equivalents be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of generating a liquefied carbon dioxide stream, the method comprising:
   generating a carbon dioxide rich flue gas stream including carbon dioxide, carbon monoxide and water vapor, wherein the carbon dioxide rich flue gas stream is generated by an air reactor and a fuel reactor wherein an oxygen carrier circulates between the air reactor and the fuel reactor;
   providing a gas having oxygen to the flue gas stream to form an oxygen enriched flue gas stream:
   subjecting the oxygen enriched flue gas stream to an oxidation catalyst for oxidizing the carbon monoxide, thereby generating a subsequent carbon dioxide rich flue gas stream having a higher level of carbon dioxide; and
   processing the subsequent carbon dioxide rich flue gas stream to form a liquefied carbon dioxide stream.

2. The method according to claim 1, wherein the oxygen enriched flue gas stream is provided to a boiler disposed upstream of the oxidation catalyst.

3. The method according to claim 1, wherein processing the subsequent carbon dioxide rich flue gas stream generates an exhaust gas.

4. The method according to claim 3, further comprising:
   venting the exhaust gas to an atmosphere.

5. The method according to claim 3, further comprising:
   providing the exhaust gas to the fuel reactor.

6. The method according to claim 1, wherein prior to subjecting the oxygen enriched flue gas stream to the oxidation catalyst, the method further comprises:
   cooling the at least one of the carbon dioxide rich flue gas stream and the oxygen enriched flue gas stream.

7. The method according to claim 1, where the carbon monoxide is present in the carbon dioxide rich flue gas stream in a concentration of at least 1% by vol. of the carbon dioxide concentration.

8. The method according to claim 1, wherein prior to subjecting the flue gas stream to the oxidation catalyst, the method further comprises:
   removing at least one of particles, sulfur oxide, nitrogen oxide, and mercury from the oxygen enriched flue gas stream prior to subjecting the oxygen enrighed flue gas stream to the oxidation catalyst.

9. The method according to claim 1, wherein the gas having oxygen is air leakage into the flue gas stream.

10. The method according to claim 1, further comprising: splitting the carbon dioxide rich flue gas stream to provide a portion of the carbon dioxide rich flue gas stream to the fuel reactor and another portion the carbon dioxide rich flue gas stream to the oxidation catalyst.

11. The method according to claim 1, wherein the gas having oxygen is an oxygen stream provided into the flue gas stream.

12. A method for reducing an amount of contaminants released by a flue gas stream processing system, the method comprising:
   generating a carbon dioxide rich flue gas stream including carbon dioxide, carbon monoxide and water vapor, wherein the carbon dioxide rich flue gas stream is generated by an air reactor and a fuel reactor wherein an oxygen carrier circulates between the air reactor and the fuel reactor;
   providing a gas having oxygen to the flue gas stream to oxidize the carbon monoxide and form a subsequent carbon dioxide rich flue gas stream, having a higher level of carbon dioxide;
   forming liquefied carbon dioxide by removing water vapor and carbon monoxide from the subsequent carbon dioxide rich flue gas stream;
   generating an exhaust gas during formation of the liquefied carbon dioxide; and
   providing the exhaust gas having a reduced level of carbon monoxide to the air reactor.

13. The method according to claim 12, wherein prior to forming liquefied carbon dioxide, the method further comprises:
   removing at least one of particles, sulfur oxide, nitrogen oxide, and mercury from the subsequent carbon dioxide rich flue gas stream.

14. The method according to claim 12, wherein prior to forming liquefied carbon dioxide, the method further comprises: cooling the at least one of the carbon dioxide rich flue gas stream and subsequent carbon dioxide rich flue gas stream.

15. The method according to claim 12 wherein the carbon monoxide concentration in the carbon dioxide rich flue gas stream is less than 1% by volume of the carbon dioxide concentration in the flue gas stream.

16. The method according to claim 12, wherein the gas having oxygen is air leakage into the flue gas stream.

17. The method according to claim 12, further comprising: splitting the carbon dioxide rich flue gas stream to provide a portion of the flue gas stream to the fuel reactor and another portion for forming liquefied carbon dioxide.

* * * * *